US009908525B2

United States Patent
Kosaka

(10) Patent No.: US 9,908,525 B2
(45) Date of Patent: Mar. 6, 2018

(54) TRAVEL CONTROL APPARATUS

(71) Applicant: HONDA MOTOR CO., LTD., Minato-ku, Tokyo (JP)

(72) Inventor: Kengo Kosaka, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 14/698,125

(22) Filed: Apr. 28, 2015

(65) Prior Publication Data
US 2015/0336577 A1   Nov. 26, 2015

(30) Foreign Application Priority Data

May 20, 2014   (JP) .................. 2014-104638

(51) Int. Cl.
| | | |
|---|---|---|
| *G05D 1/00* | (2006.01) | |
| *G05D 3/00* | (2006.01) | |
| *G06F 7/00* | (2006.01) | |
| *G06F 17/00* | (2006.01) | |
| *B60W 30/09* | (2012.01) | |
| *G08G 1/16* | (2006.01) | |

(52) U.S. Cl.
CPC .............. *B60W 30/09* (2013.01); *G08G 1/16* (2013.01); *G08G 1/167* (2013.01); *B60W 2420/52* (2013.01); *B60W 2550/30* (2013.01); *B60W 2550/304* (2013.01); *B60W 2550/306* (2013.01)

(58) Field of Classification Search
CPC ................................ B60W 30/16; G08G 1/167
USPC ............................................................ 701/1
See application file for complete search history.

(56) References Cited

U.S. PATENT DOCUMENTS

2008/0161986 A1* 7/2008 Breed .................... G08G 1/161
                                                              701/23
2015/0232073 A1* 8/2015 Fujishiro .................. B60T 7/22
                                                              701/70

FOREIGN PATENT DOCUMENTS

| CN | 102696060 A | 9/2012 |
|---|---|---|
| CN | 103547840 A | 1/2014 |
| DE | 112012006878 T5 | 5/2015 |
| JP | 2000-127900 A | 5/2000 |
| JP | 2000-137900 A | 5/2000 |
| JP | 2004-150912 A | 5/2004 |
| JP | 2004150912 A * | 5/2004 |
| JP | 2008-080845 A | 4/2008 |
| JP | 2010-257298 A | 11/2010 |

(Continued)

OTHER PUBLICATIONS

Office Action dated Jul. 14, 2016 for corresponding German Patent Application 10 2015 207 755.1.

(Continued)

*Primary Examiner* — Maceeh Anwari
(74) *Attorney, Agent, or Firm* — Carrier Blackman & Associates, P.C.; Joseph P. Carrier; Jeffrey T. Gedeon

(57) ABSTRACT

A travel control apparatus includes: a detection device configured to detect an object ahead in a travel direction of a vehicle; and a vehicle control device configured to perform a vehicle control in which the object is regarded as a control reference when a lateral movement speed of the object is directed to a travel lane of the vehicle, wherein even when the lateral movement speed of the object is directed to the travel lane of the vehicle, when the object is detected in right and left ends of a detection range of the detection device, the vehicle control device prevents the vehicle control.

3 Claims, 4 Drawing Sheets

(56) References Cited

FOREIGN PATENT DOCUMENTS

JP        2010-286246 A    12/2010

OTHER PUBLICATIONS

Office Action issued in the corresponding Japanese Patent Application 2014-104638 dated Nov. 29, 2016, with the English translation thereof.
Office Action issued in the corresponding Chinese Patent Application 201510178075.3 dated Jan. 20, 2017, with the English translation.
Office Action issued over the corresponding Japanese Patent Application No. 2014-104638 with the English translation thereof, and dated Apr. 25, 2017.

* cited by examiner

TRAVEL CONTROL APPARATUS

CROSS-REFERENCE TO RELATED APPLICATION

Priority is claimed on Japanese Patent Application No. 2014-104638, filed on May 20, 2014, the contents of which are incorporated herein by reference.

BACKGROUND

Field of the Invention

The present invention relates to a travel control apparatus.

Background

In the related art, an apparatus is known that is configured to detect an object by a laser radar sensor in which a detection range is set ahead in the travel direction of a vehicle and to regard the object as a follow-up target when a predicted lateral location calculated from a lateral movement speed of the object is within a travel lane of the vehicle (for example, refer to Japanese Patent Application, Publication No. 2000-137900A).

SUMMARY

According to the above apparatus of the related art, since in right and left ends of the detection range, due to the movement of the detection range along with the movement of the vehicle, part of the object becomes out of the detection range, and a detected size and a detected centroid change, there is a case of an erroneous detection that even a still object has a lateral movement speed.

In view of the foregoing, an object of an aspect of the present invention is to provide a travel control apparatus capable of appropriately performing a travel control of a vehicle in response to recognition of a preceding vehicle.

(1) A travel control apparatus according to an aspect of the present invention includes: a detection device configured to detect an object ahead in a travel direction of a vehicle; and a vehicle control device configured to perform a vehicle control in which the object is regarded as a control reference when a lateral movement speed of the object is directed to a travel lane of the vehicle, wherein even when the lateral movement speed of the object is directed to the travel lane of the vehicle, when the object is detected in right and left ends of a detection range of the detection device, the vehicle control device prevents the vehicle control.

(2) In the travel control apparatus of the above (1), the vehicle control device may narrow a location range in which the object is regarded as the control reference in a case where the object is detected in the right and left ends of the detection range of the detection device, relative to a case where the object is detected more inside than the right and left ends of the detection range of the detection device.

(3) In the travel control apparatus of the above (1) or (2), the vehicle control device may regard the object as the control reference when a movement vector of the object impacts a current location of the vehicle.

(4) In the travel control apparatus of any one of the above (1) to (3), the vehicle control device may not regard the object as the control reference when a change of a distance to the object in the travel direction of the vehicle is trending downward and the object is continuously detected in the right and left ends of the detection range of the detection device for a predetermined duration.

(5) In the travel control apparatus of the above (4), the vehicle control device may regard the object as the control reference when the change of the distance to the object in the travel direction of the vehicle is trending downward and the object is continuously detected in the right and left ends of the detection range of the detection device for a second predetermined duration or more, the second predetermined duration being longer than the predetermined duration.

According to the travel control apparatus of the aspect of the above (1), since the vehicle control is prevented even when the lateral movement speed of the object is erroneously detected due to part of the object being detected in the right and left ends of the detection range of the detection device, it is possible to prevent unnecessary or excessive vehicle control from being performed.

Further, in the case of the above (2), with respect to the object detected in the right and left ends of the detection range of the detection device, by narrowing the location range in which the object is regarded as the control reference, the vehicle control is prevented, and it is possible to prevent unnecessary or excessive vehicle control from being performed.

Further, in the case of the above (3), since even when the object is detected in the right and left ends of the detection range of the detection device, when the movement vector of the object that impacts the current location of the vehicle is detected, the object is regarded as the control reference, it is possible to perform an appropriate vehicle control. Further, since the object has already been regarded as the control reference, even when it becomes clear that the movement vector of the object is not erroneously detected, it is possible to promptly continue and perform an appropriate vehicle control.

Further, in the case of the above (4), since the object continuously detected in the right and left ends of the detection range of the detection device for the predetermined duration along with the decrease of the distance is not regarded as the control reference, it is possible to prevent unnecessary or excessive vehicle control from being performed.

Further, in the case of the above (5), since the object is regarded as the control reference when the object is continuously detected in the right and left ends of the detection range of the detection device for the second predetermined duration or more along with the decrease of the distance, the second predetermined duration being longer than the predetermined duration, it is possible to prevent unnecessary or excessive vehicle control from being performed. Further, since the object has already been regarded as the control reference along with the decrease of the distance, even when the object is detected more inside than the right and left ends of the detection range, it is possible to promptly perform an appropriate vehicle control.

DESCRIPTION OF THE EMBODIMENTS

Hereinafter, a travel control apparatus according to an embodiment of the present invention will be described with reference to the accompanying drawings.

Figure 1:
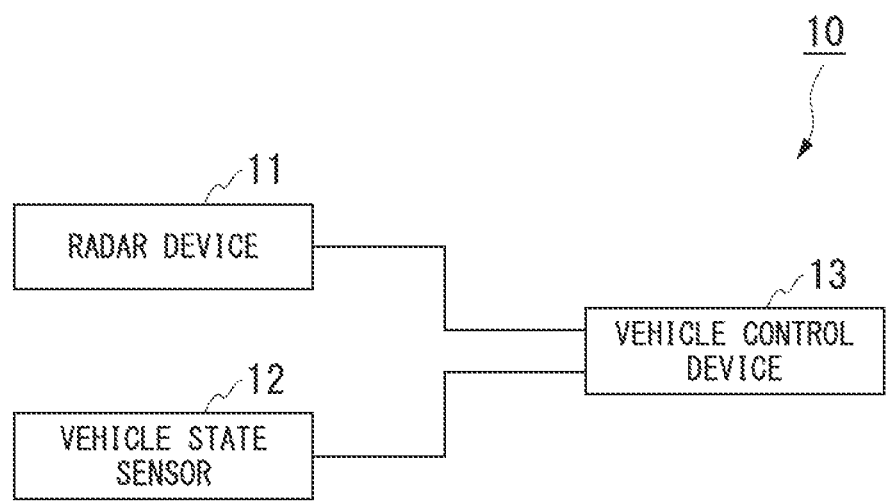
FIG. 1 is a configuration diagram of a travel control apparatus according to an embodiment of the present invention.

As shown in FIG. 1, a travel control apparatus 10 according to the present embodiment includes a radar device 11 (detection device), a vehicle state sensor 12, and a vehicle control device 13. The travel control apparatus 10 is provided on a vehicle 1.

The radar device 11 divides a detection range 11a set in the external environment of the vehicle 1 into a plurality of angle regions and transmits transmission signals of electromagnetic waves such that each angle region is scanned. The radar device 11 receives a reflection signal of a reflection wave arising from each transmission signal being reflected by an external object (for example, a pedestrian, another vehicle (second vehicle), a variety of still objects on the road or above the road, and the like) of the vehicle 1. The radar device 11 generates detection signals depending on the transmission signal and the reflection signal, for example, a detection signal according to the distance from the radar device 11 to the object, the location of the object (at least the azimuth angle, the angle of elevation, and the like), the relative speed of the object with respect to the vehicle 1, and the like, and outputs the detection signals.

The vehicle state sensor 12 detects a variety of vehicle information of the vehicle 1 and outputs a signal of the detected vehicle information. The vehicle state sensor 12 includes, for example, a vehicle speed sensor, an acceleration sensor, a gyro sensor, a yaw rate sensor, a steering angle sensor, a steering torque sensor, and the like. The vehicle speed sensor detects a rotation speed (wheel speed) of the drive wheel of the vehicle 1 and detects a speed (vehicle speed) of the vehicle body based on the wheel speed. The acceleration sensor detects an acceleration that acts on the vehicle body. The gyro sensor detects an attitude of the vehicle body or a travel direction. The yaw rate sensor detects a yaw rate (rotational angular speed around a vertical axis of a vehicle centroid) of the vehicle body. The steering angle sensor detects the direction and the amplitude of a steering angle of a steering wheel. The steering torque sensor detects the direction and the amplitude of a steering torque input to the steering wheel. The vehicle state sensor 12 includes a receiver that receives a positioning signal of a positioning system (for example, Global Positioning System: GPS, Global Navigation Satellite System: GNSS, or the like) used to measure the location of the vehicle 1 by using a satellite. The vehicle state sensor 12 detects a current location of the vehicle 1 based on the positioning signal. The vehicle state sensor 12 may detect the current location of the vehicle 1 by using a calculation process of an autonomous navigation by use of the vehicle speed, the yaw rate, and the like of the vehicle 1 together with the positioning signal.

The vehicle control device 13 is configured by an electronic circuit including a CPU (Central Processing Unit), a variety of storage media such as a RAM (Random Access Memory), a timer, and the like.

The vehicle control device 13 uses the detection signal output from the radar device 11 and detects an object that exists around the vehicle 1.

The vehicle control device 13 performs a variety of travel controls that assists driving of the vehicle 1 in accordance with the object detected by the radar device 11. As a variety of travel controls, the vehicle control device 13 performs, for example, an inter-vehicle gap keeping travel control used to keep the inter-vehicle distance with a preceding vehicle constant, a follow-up travel control used to follow-up a preceding vehicle, a contact avoidance control that performs an operation such as contact avoidance with respect to an external object and impact reduction at the time of a contact, and the like. When performing a variety of travel controls, the vehicle control device 13 outputs a control signal used to control, for example, a notification operation by a notification device, a braking operation by a brake device, a steering operation by a steering device, and the like.

The notification device includes a seat belt device, a steering device, and the like that perform notification in a tactile manner by fastening using a seat belt, vibration of a steering, and the like. The notification device includes a display device, a lamp body, and the like that perform notification in a visual manner by display, lighting, and the like. The notification device includes a loudspeaker and the like that perform notification in an auditory manner through electronic sounds, speech, and the like.

The vehicle control device 13 calculates a lateral movement speed of the object detected ahead in the travel direction of the vehicle 1 by the radar device 11 and performs a vehicle control in which the object is regarded as a control reference when the lateral movement speed of the object is directed to a travel lane of the vehicle 1. Further, even when the lateral movement speed of the object detected by the radar device 11 is directed to the travel lane of the vehicle 1, when the object is detected in right and left ends of the detection range 11a of the radar device 11, the vehicle control device 13 prevents vehicle control.

Figure 2:
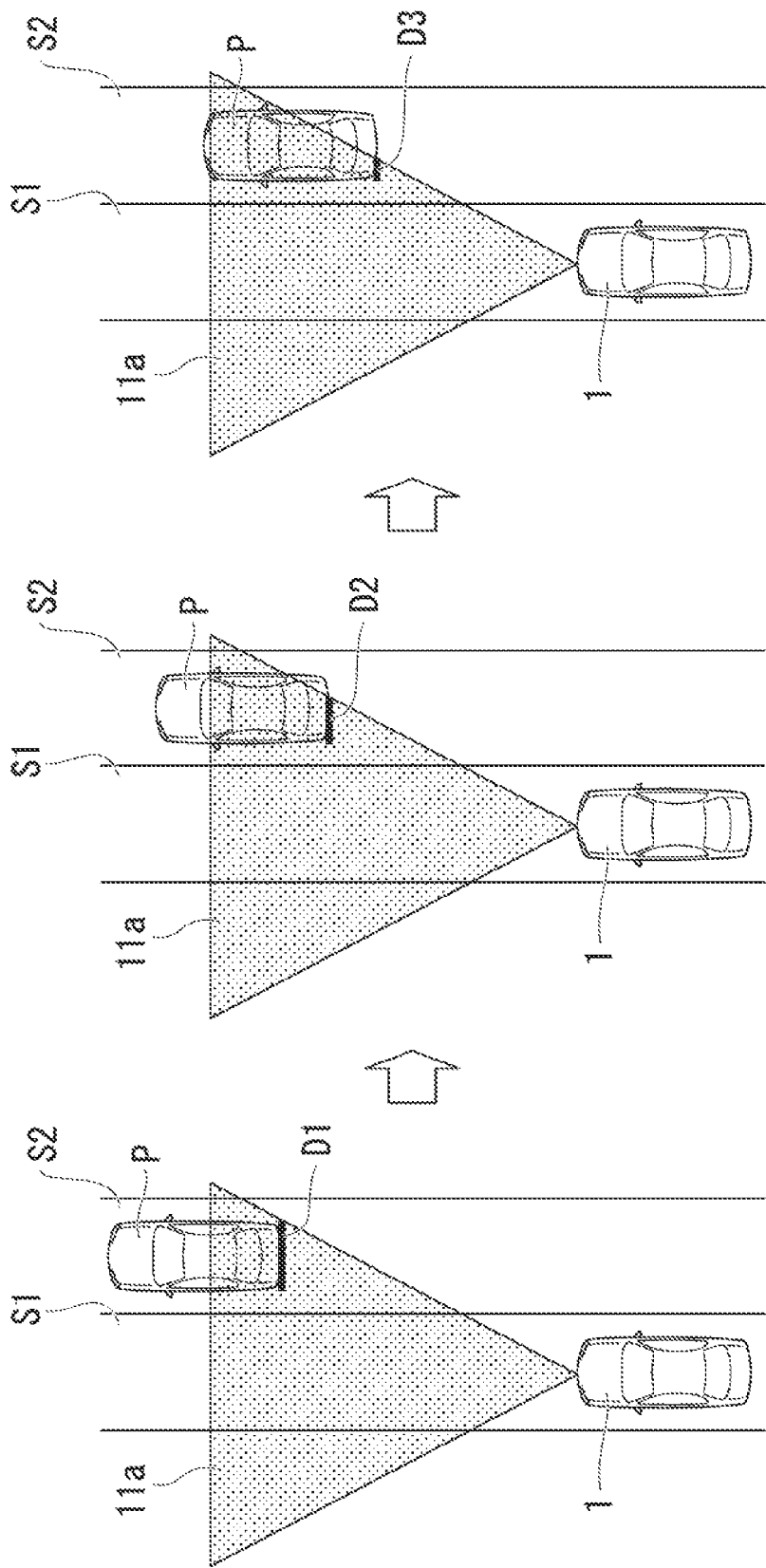
FIG. 2 is a diagram showing an example of a movement of a second vehicle that travels in an adjacent lane and is continuously detected in right and left ends of a detection range by a radar device of the travel control apparatus according to the embodiment of the present invention.
Figure 3:
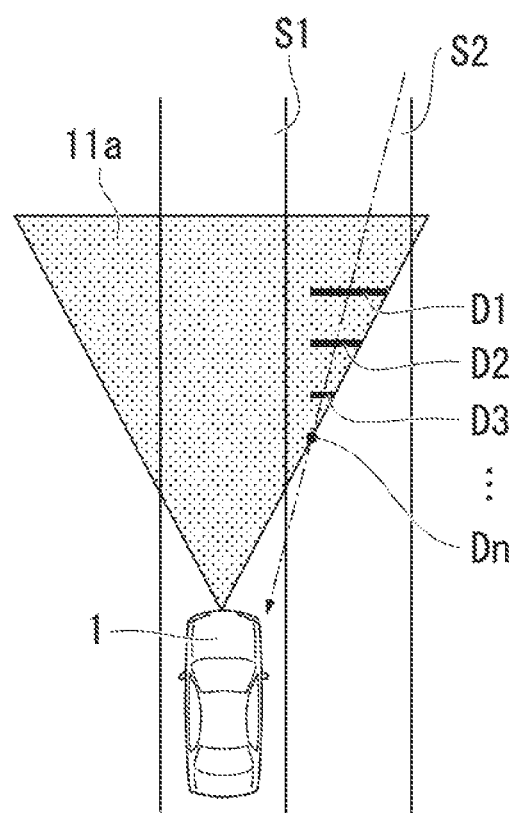
FIG. 3 is a diagram showing an example of a change in detection widths of the second vehicle that travels in the adjacent lane and is continuously detected in the right and left ends of the detection range by the radar device of the travel control apparatus according to the embodiment of the present invention.

As shown in FIG. 2, when the object is detected in the right and left ends of the detection range 11a of the radar device 11, the vehicle control device 13 determines that, for example, there is a possibility of part of a second vehicle P that travels in an adjacent lane S2 which is adjacent to a travel lane S1 of the vehicle 1 being detected. When the change of a distance to the object in the travel direction of the vehicle 1 is trending downward (that is, a distance to the object in the travel direction of the vehicle 1 is decreasing) and the object is continuously detected in the right and left ends of the detection range 11a of the radar device 11, the vehicle control device 13 determines that there is a possibility of the lateral movement speed of the object being erroneously detected. For example, as shown in FIG. 2, in a case where the change of the distance between the vehicle 1 and the second vehicle P which is continuously detected in the right and left ends of the detection range 11a of the radar device 11 is trending downward, the vehicle control device 13 detects that the change of time-series detection widths D1, D2, . . . Dn of the second vehicle P is trending downward. As shown in FIG. 3, when the vehicle control device 13 detects that the location (for example, a center location, a centroid of the reflection intensity distribution, or the like) of the time-series detection widths D1, D2, . . . Dn of the second vehicle P is displaced toward the travel lane S1 of the vehicle 1, the vehicle control device 13 first regards the second vehicle P as a control reference of the vehicle control. Further, in response to the second vehicle P being continuously detected in the right and left ends of the detection range 11a of the radar device 11, the vehicle control device 13 determines that there is a possibility of the lateral movement speed which is directed to the travel lane S1 of the vehicle 1 and is detected such that the second vehicle P has the lateral movement speed being incorrect, and prevents vehicle control.

The vehicle control device 13 prevents vehicle control, for example, by a change of a magnitude of the vehicle control, a change of a threshold value relating to a distance to the object and a timing according to a vehicle control start or a vehicle control end, a change of a timing when the object is regarded as the control reference, a cancellation of a setting in which the object is regarded as the control reference, or the like. For example, in the contact avoidance control, the vehicle control device 13 prevents vehicle control by making the timing when the object is regarded as the control reference later than that at the time of a normal control. For example, in the contact avoidance control, the vehicle control device 13 prevents vehicle control by making a relative distance of performing the notification operation or the braking operation being permitted, or a collision margin time (Time To Collision: TTC=relative distance/relative speed), shorter than that at the time of a normal control.

The vehicle control device 13 narrows a location range (control reference location range) used to regard the object as the control reference of the vehicle control in a case where the object is detected in the right and left ends of the detection range 11a of the radar device 11, relative to a case where the object is detected more inside than the right and left ends of the detection range 11a of the radar device 11. For example, the vehicle control device 13 sets a control reference location range which is wider than a control reference location range for an object that exists in the travel lane S1 of the vehicle 1, for an object having a lateral moving speed directed to the travel lane S1 of the vehicle 1, but narrows the lateral direction of the wide control reference location range (that is, the control reference location range for the object having the lateral moving speed directed to the travel lane S1 of the vehicle 1). Further, when the vehicle control device 13 narrows the lateral direction of the control reference location range for the object having the lateral moving speed directed to the travel lane S1 of the vehicle 1, the vehicle control device 13 may set the control reference location range back to the control reference location range in a case where the object exists in the travel lane S1 of the vehicle 1.

The vehicle control device 13 regards the object as the control reference of the vehicle control when a distance to the object detected by the radar device 11 in the travel direction of the vehicle 1 is a predetermined distance or less.

The vehicle control device 13 regards the object as the control reference of the vehicle control when a movement vector of the object detected by the radar device 11 impacts a current location of the vehicle 1.

The vehicle control device 13 regards the object as out of the control reference of the vehicle control when the change of the distance to the object detected by the radar device 11 in the travel direction of the vehicle 1 is trending downward and the object is continuously detected in the right and left ends of the detection range 11a of the radar device 11 for a first predetermined duration.

The vehicle control device 13 sets the object as the control reference of the vehicle control again when the object is continuously detected in the right and left ends of the detection range 11a of the radar device 11 for a second predetermined duration that is greater than the first predetermined duration.

The travel control apparatus 10 according to the present embodiment includes the above configuration. Next, an operation of the travel control apparatus 10 is described.

Hereinafter, a contact avoidance control performed by the vehicle control device 13, that is, a control that performs contact avoidance with respect to an external object, impact reduction at the time of a contact, and the like is described.

Figure 4:
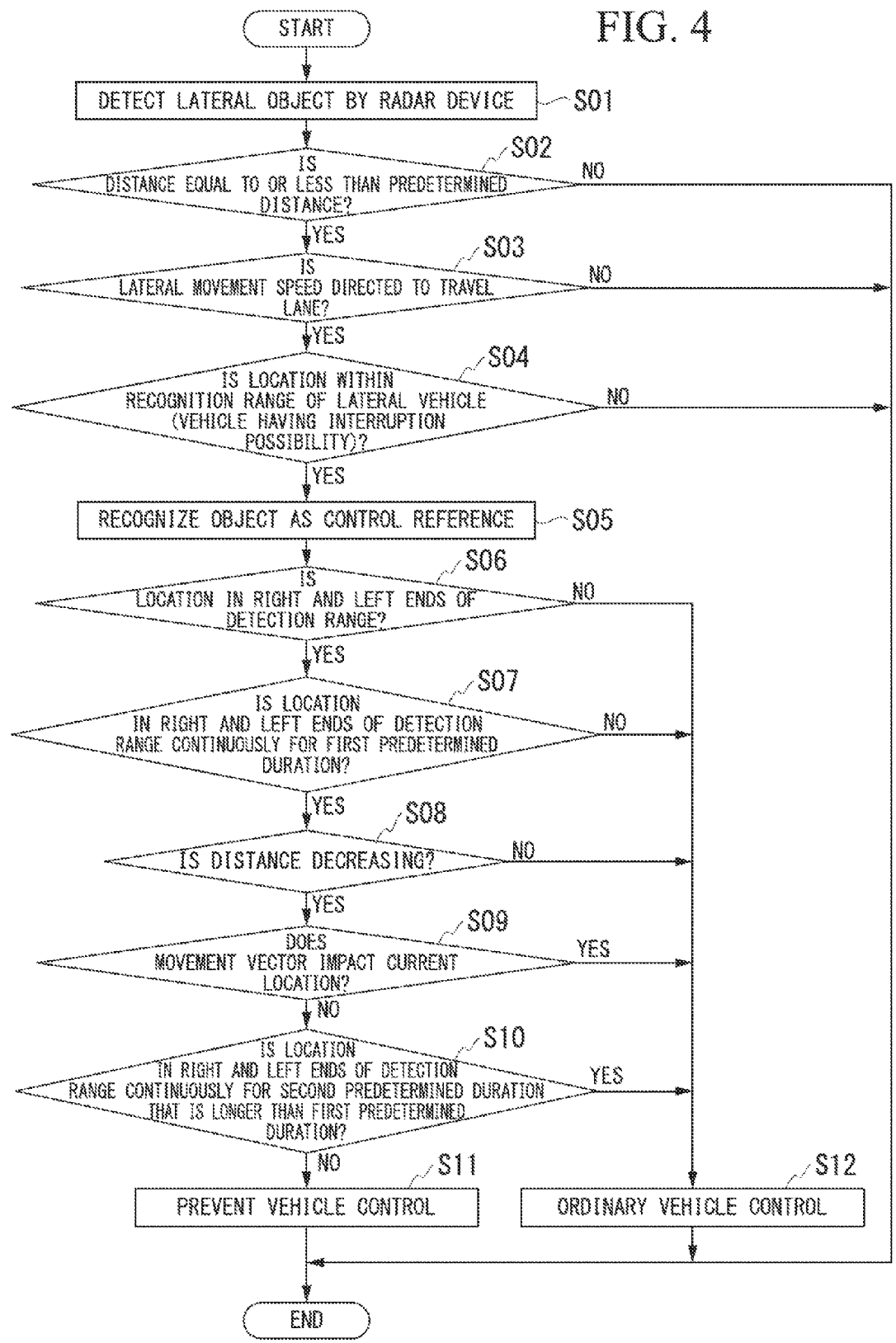
FIG. 4 is a flowchart showing an operation of the embodiment of the travel control apparatus according to the embodiment of the present invention.

First, as shown in FIG. 4, the vehicle control device 13 detects a location, a speed, an acceleration, and the like of a lateral object that exists in the lateral direction around the vehicle 1 by using a detection signal output from the radar device 11 (step S01).

Next, the vehicle control device 13 determines whether or not the distance to the object is a predetermined distance or less (step S02).

When the determination result is "YES, the vehicle control device 13 advances the process to step S03 (step S02: YES).

On the other hand, when the determination result is "NO, the vehicle control device 13 ends the process (step S02: NO).

Next, the vehicle control device 13 determines whether or not the lateral movement speed of the object is directed to the travel lane S1 of the vehicle 1 (step S03).

When the determination result is "YES, the vehicle control device 13 advances the process to step S04 (step S03: YES).

On the other hand, when the determination result is "NO, the vehicle control device 13 ends the process (step S03: NO).

Next, the vehicle control device 13 determines whether or not the location of the object is within a recognition range of a lateral vehicle (that is, a vehicle having a possibility of performing an operation to break into the travel of the vehicle 1) (step S04). Since there is a possibility that the lateral movement is erroneously detected due to the object existing in the right and left ends of the detection range 11a, the recognition range is set to be smaller than the location range used in the ordinary vehicle control (that is, a vehicle control that does not perform control prevention). Since a laterally moving object is regarded as the control reference, the location range used in the ordinary vehicle control is set to be greater compared to that in a case where an object that is not laterally moving is regarded as the control reference.

When the determination result is "YES, the vehicle control device 13 advances the process to step S05 (step S04: YES).

On the other hand, when the determination result is "NO, the vehicle control device 13 ends the process (step S04: NO).

Then, the vehicle control device 13 regards the object as the control reference of the vehicle control (step S05).

Next, the vehicle control device 13 determines whether or not the location of the object is in the right and left ends of the detection range 11a of the radar device 11 (step S06).

When the determination result is "YES, the vehicle control device 13 advances the process to step S07 (step S06: YES).

On the other hand, when the determination result is "NO, the vehicle control device 13 advances the process to step S12 (step S06: NO).

Then, the vehicle control device 13 determines whether or not the location of the object is in the right and left ends of the detection range 11a of the radar device 11 continuously for a first predetermined duration (step S07).

When the determination result is "YES, the vehicle control device 13 advances the process to step S08 (step S07: YES).

On the other hand, when the determination result is "NO, the vehicle control device 13 advances the process to step S12 (step S07: NO).

Next, the vehicle control device 13 determines whether or not the change of a distance to the object is trending downward (step S08).

When the determination result is "YES, the vehicle control device 13 advances the process to step S09 (step S08: YES).

On the other hand, when the determination result is "NO, the vehicle control device 13 advances the process to step S12 (step S08: NO).

Then, the vehicle control device 13 determines whether or not a movement vector of the object impacts a current location of the vehicle 1 (step S09).

When the determination result is "YES, the vehicle control device 13 advances the process to step S12 (step S09: YES).

On the other hand, when the determination result is "NO, the vehicle control device 13 advances the process to step S10 (step S09: NO).

Then, the vehicle control device 13 determines whether or not the location of the object is in the right and left ends of the detection range 11a of the radar device 11 continuously for a second predetermined duration that is longer than the first predetermined duration (step S10).

When the determination result is "YES, the vehicle control device 13 advances the process to step S12 (step S10: YES).

On the other hand, when the determination result is "NO, the vehicle control device 13 advances the process to step S11 (step S10: NO).

Then, the vehicle control device 13 prevents vehicle control (step S11) and ends the process.

Alternatively, the vehicle control device 13 sets performing of the ordinary vehicle control (step S12) without preventing the vehicle control and ends the process.

As described above, according to the travel control apparatus 10 of the present embodiment, even when the lateral movement speed of the object is erroneously detected due to part of the object being detected in the right and left ends of the detection range 11a of the radar device 11, by preventing the vehicle control, it is possible to prevent unnecessary or excessive vehicle control from being performed.

Further, by narrowing the control reference location range (specifically, a range in the lateral direction) for the object detected in the right and left ends of the detection range 11a of the radar device 11, it is possible to appropriately prevent the vehicle control.

Further, in a range equal to or less than a predetermined distance where the second vehicle P that travels in the adjacent lane S2 of the travel lane S1 of the vehicle 1 is easily detected in the right and left ends of the detection range 11a of the radar device 11, it is possible to regard the object as the control reference and to adequately prevent the vehicle control. Furthermore, since the object has already been regarded as the control reference in the range equal to or less than the predetermined distance, even when the object is detected more inside than the right and left ends of the detection range 11a, it is possible to promptly terminate preventing vehicle control and to perform an appropriate vehicle control.

Further, even with respect to the object detected in the right and left ends of the detection range 11a of the radar device 11, when the movement vector of the object is detected such that the movement vector impacts the current location of the vehicle 1, the object is regarded as the control reference, and therefore it is possible to appropriately perform the vehicle control. Furthermore, since the object has already been regarded as the control reference according to the movement vector, even when it becomes clear that the movement vector of the object is not erroneously detected, it is possible to promptly continue the vehicle control and to perform an appropriate vehicle control.

Further, since the object that is continuously detected in the right and left ends of the detection range 11a of the radar device 11 for the first predetermined duration along with the decrease of the distance to the object is not regarded as the control reference, it is possible to prevent unnecessary or excessive vehicle control from being performed.

Further, since the object is regarded as the control reference when the object is continuously detected in the right and left ends of the detection range 11a of the radar device 11 for the second predetermined duration that is longer than the first predetermined duration along with the decrease of the distance, it is possible to prevent unnecessary or excessive vehicle control from being performed. Furthermore, since the object has already been regarded as the control reference in accordance with the decrease of the distance, even when the object is detected more inside than the right and left ends of the detection range 11a, it is possible to promptly perform an appropriate vehicle control.

Note that, in the embodiment described above, when all the determination results of the determination processes in steps S02 to S04 shown in FIG. 4 are "YES, the vehicle control device 13 regards the object as the control reference of the vehicle control; however, the embodiment is not limited thereto. For example, the vehicle control device 13 may regard the object as the control reference of the vehicle control when at least any one of the determination results of the determination processes in steps S02 to S04 shown in FIG. 4 is "YES.

Further, in the embodiment described above, when all the determination results of the determination processes in steps S06 to S08 shown in FIG. 4 are "YES and when all the determination results of the determination processes in steps S09, S10 are "NO, the vehicle control device 13 prevents vehicle control; however, the embodiment is not limited thereto. For example, the vehicle control device 13 may prevent the vehicle control in response to at least any one of the determination results described above.

Note that, in the embodiment described above, the travel control apparatus 10 may include an imaging device that captures an image of an imaging range set in the external environment of the vehicle 1. The vehicle control device 13 may recognize the category of the object detected by the radar device 11, the travel lane S1 of the vehicle 1, the adjacent lane S2, and the like by performing a predetermined recognition process on image data output from the imaging device. The vehicle control device 13 may switch between prevention manners when the vehicle control is prevented depending on the category of the object detected by the radar device 11.

The above embodiment is described just as an example and is not intended to limit the scope of the invention. The novel embodiment described above can be implemented in a variety of other configurations, and a variety of omissions, substitutions, and modifications can be made without departing from the scope of the invention. The embodiment described above and the modified embodiments are included in the scope of the invention and included in the invention in the scope of the appended claims and the equivalent to the claimed invention.

What is claimed is:

1. A travel control apparatus comprising:
a detection device having a detection range, configured to detect an object in the detection range ahead in a travel direction of a vehicle; and
a vehicle control device configured to perform a vehicle control in which the object is regarded as a control reference when a lateral movement speed of the object in the detection range is directed to a travel lane of the vehicle, wherein
even when the lateral movement speed of the object is directed to the travel lane of the vehicle, when the object is detected on a right or a left end of the detection range of the detection device, the vehicle control device prevents said vehicle control,
wherein the vehicle control device does not regard the object as the control reference when a change of a distance to the object in the travel direction of the vehicle is trending downward and the object is continuously detected on the right or the left end of the detection range of the detection device for a predetermined duration, and
the vehicle control device regards the object as the control reference when the change of the distance to the object in the travel direction of the vehicle is trending downward and the object is continuously detected on the right or the left end of the detection range of the detection device for a second predetermined duration or more, the second predetermined duration being longer than the predetermined duration.

2. The travel control apparatus according to claim 1, wherein
the vehicle control device narrows a location range in which the object is regarded as the control reference in a case where the object is detected on the right or the left end of the detection range of the detection device, relative to a case where the object is detected more inside than the right and left ends of the detection range of the detection device.

3. The travel control apparatus according to claim 1, wherein
the vehicle control device regards the object as the control reference when a movement vector of the object impacts a current location of the vehicle.

* * * * *